United States Patent [19]

Inoue

[11] 4,353,100

[45] Oct. 5, 1982

[54] MAGNETIC RECORDING SYSTEM WITH SIGNAL-CONTROLLED BIAS AND EQUALIZATION

[75] Inventor: Hideo Inoue, Mitaka, Japan

[73] Assignee: Teac Corporation, Tokyo, Japan

[21] Appl. No.: 176,710

[22] Filed: Aug. 11, 1980

[30] Foreign Application Priority Data

Aug. 31, 1979 [JP] Japan .................................. 54-111858
Nov. 8, 1979 [JP] Japan .................................. 54-144833

[51] Int. Cl.³ .......................... G11B 5/45; G11B 5/47
[52] U.S. Cl. ......................................... 360/65; 360/66
[58] Field of Search ........................ 360/65, 66, 68, 31

[56] References Cited

U.S. PATENT DOCUMENTS 4,220,979 9/1980 Kitamura et al. ...................... 360/66
4,263,624 4/1981 Gundry .................................. 360/65
4,279,005 7/1981 Kitamura et al. ..................... 360/65

OTHER PUBLICATIONS

"Headroom Extension for Slow Speed Magnetic Recording of Audio"—Kenneth Gundry.

Primary Examiner—Vincent P. Canney

Attorney, Agent, or Firm—Woodcock, Washburn, Kurtz, Mackiewicz & Norris

[57] ABSTRACT

A stereophonic magnetic tape recording system having a pair of magnetic recording heads each provided with its own signal processing circuit including amplifiers, an equalizer, etc. Shared by both channels, a bias oscillator feeds a bias current, having a frequency higher than the spectrum of the information signals to be recorded, to both record heads. For continuously adapting the recording bias and equalization to the high frequency portions of the information signals, each channel is further provided with a variable impedance circuit connected in parallel with one of the record heads, and a control circuit for varying the impedance of the variable impedance circuit as dictated by the high frequency portion of the corresponding information signal. A decrease in the impedance of each variable impedance circuit results in the reduction of the bias current fed to the corresponding recording head and of the high frequency level of the information signal; conversely, an increase in the impedance of the variable impedance circuit results in an increase in the bias current and in the high frequency level of the information signal.

6 Claims, 11 Drawing Figures

MAGNETIC RECORDING SYSTEM WITH SIGNAL-CONTROLLED BIAS AND EQUALIZATION

BACKGROUND OF THE INVENTION

My invention concerns a system for recording information, such as audio signals, on magnetic record media notably including magnetic tape. More specifically, my invention deals with such a magnetic recording system incorporating the concept of variable, signal-controlled recording bias and equalization to suit the spectrum of the information signal being recorded.

The magnetic recording of information on tape or like recording media requires the feeding of a high-frequency signal, termed a bias, to the recording head together with the information signal being recorded, for the reduction of distortion. The information signal must further undergo a corrective process called equalization, and must be fed to the recording head at a suitable level, to be properly recorded on magnetic tape or the like.

The magnitude of the high frequency bias current had long been fixed at a value chosen in view of the expected relative levels of the low and high frequencies of the input spectrum. The choice was a compromise one, however. The conventional fixed values of bias were usually too high for high frequencies, inhibiting their faithful recording or playback. Thus the tape decks or similar devices built on the fixed bias principle did not necessarily satisfy the discriminating ears of audiophiles.

A solution to the above problem is the Dolby headroom extension (HX) system proposed by Kenneth Gundry, of Dolby Laboratories, Inc., at the 64th convention of the Audio Engineering Society (AES) held in November, 1979, in New York City (available in written form as an AES preprint entitled "Headroom Extension for Slow-Speed Magnetic Recording of Audio"). The Dolby HX system (shown in FIG. 1 of the attached drawings) includes a control circuit for reducing bias in response to high levels at high frequencies of the program being recorded. The reduced bias makes it possible to make an accurate recording of the high frequencies without sacrifice of performance of low frequencies.

Admittedly, the Dolby HX system enables the addition of nearly optimum bias to the information signal of varying frequencies from moment to moment. It does, however, possess its own drawbacks.

Both channels of a stereophonic magnetic recording system according to the Dolby HX scheme share one and the same bias oscillator and its control means. With changes in bias voltage applied to the bias oscillator, therefore, corresponding variations in bias current occur in both channels. This presents no problem at all as long as the signals on the two channels have the same frequencies and the same levels. A problem arises when, as is usually the case with audio signals, the signal frequencies and levels differ between the two channels. An obvious solution is to provide a different bias oscillator, as well as associated control means, for each channel, but this will make the circuit configuration unnecessarily complex.

Another objection to the Dolby HX system comes from the fact that the bias oscillator must also deliver its output to the erase head or heads. Since the bias changes take place at the bias oscillator itself, the magnitude of the erase signal varies inevitably. Thus the erase head or heads will not offer a uniform erasing function.

SUMMARY OF THE INVENTION

A general object of my invention resides in the provision of an improved magnetic recording system capable of accurately and continuously adapting the recording bias and equalization to suit the high frequency spectrum of the material to be recorded.

A more specific object of the invention is to separately control the recording bias and equalization characteristics of the two channels of a stereophonic magnetic recording system in accordance with the respective high frequency portions of the information signals being fed along the two channels to be recorded on a desired record medium, without making the circuit configuration of the system unnecessarily complex.

Another specific object of my invention is to vary the value of recording bias without in any way changing the magnitude of the erase signal applied from the bias oscillator to the erase head or heads.

Stated in its perhaps broadest aspect, the improved magnetic recording system according to my invention comprises an information signal processing circuit, including the usual amplifier means, equalizer means, etc., for delivering to a magnetic head an information signal to be recorded. A bias oscillator is also coupled to the magnetic head for feeding thereto a bias current having a frequency above the spectrum of the information signal. Connected in parallel with the magnetic head is a variable impedance circuit which provides variable impedance to modify the recording bias and equalization to suit the high frequency portion of the information signal. A control circuit is connected to the control input of the variable impedance circuit for varying its impedance. A decrease in the impedance of the variable impedance circuit results in a simultaneous decrease in the magnitude of the bias current fed to the magnetic head and in the high frequency level of the information signal, whereas an increase in its impedance results in a simultaneous increase in the magnitude of the bias current fed to the magnetic head and in the high frequency level of the information signal.

In a preferred embodiment the variable impedance circuit includes a transformer having a primary winding connected in parallel with the magnetic head. The secondary winding of the transformer is in parallel connection with a bias control transistor and with a level or equalization control transistor. Thus the transformer performs the dual function of bias and equalization controls.

My invention is readily adaptable for a stereophonic magnetic recording system, as in the embodiment disclosed herein, in which the two channels are provided with their own variable impedance circuits and control circuits but can make common use of the bias oscillator. The bias and the equalization characteristics of the two channels can then be controlled individually to suit the respective high frequency portions of the stereophonic information signals being recorded.

According to a further feature of my invention the output level of the bias oscillator itself remains constant in spite of the varying values of bias applied to the recording head or heads. The high-frequency output signal of the bias oscillator can therefore be applied directly to the erase head or heads of the system without adversely affecting the performance thereof.

The above and other objects, features and advantages of my invention and the manner of attaining them will become more apparent, and the invention itself will best be understood, from the following detailed description taken in connection with the attached drawings.

DETAILED DESCRIPTION

Figure 1:
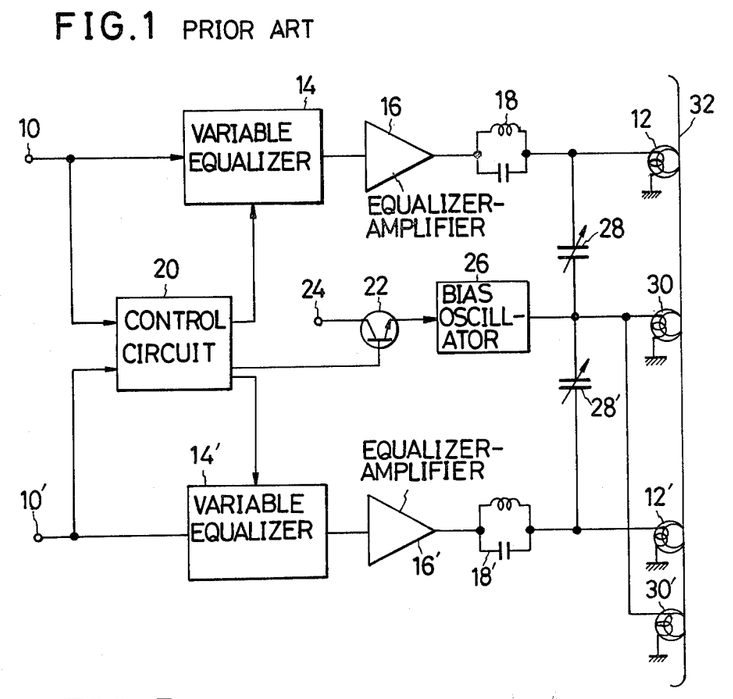
FIG. 1 is a schematic diagram, partly in block form, of the prior art two-channel magnetic recording system incorporating the Dolby HX principle.

I consider it essential that because of its particular pertinence to my invention, the conventional Dolby HX system be shown and described in some more detail, the better to distinguish the features and advantages of my invention. FIG. 1 shows the Dolby HX system as adapted for a stereophonic magnetic tape recorder. The recorder has a pair of record input terminals 10 and 10'. The input terminal 10 is connected to a magnetic record head 12 via variable equalizer 14, equalizer-amplifier circuit 16, and bias trap circuit 18. The other input terminal 10' is likewise coupled to another record head 12' via variable equalizer 14', equalizer-amplifier circuit 16', and bias trap circuit 18'.

Shared by both channels, a control circuit 20 has its inputs connected to both input terminals 10 and 10', and its outputs connected to both variable equalizers 14 and 14'. The control circuit 20 has another output coupled to the base of a transistor 22 connected between supply terminal 24 and bias oscillator 26. The output of the bias oscillator 26 is coupled to both record heads 12 and 12' via respective capacitors 28 and 28', besides being coupled directly to a pair of erase heads 30 and 30'. At 32 is shown magnetic tape.

Upon sensing high levels at high frequencies of the incoming information signals the control circuit 20 causes the transistor 22 to reduce the supply voltage applied to the bias oscillator 26. The result is a change of bias to a lower value suitable for recording the high frequency signals on the magnetic tape 32. The change in recording bias leads to a change in the sensitivity of the tape 32, particularly at high frequencies. Therefore, under the control of the control circuit 20, the pair of variable equalizers 14 and 14' correspondingly modify their equalization characteristics for a flat frequency response.

As has been pointed out, this prior art system has the drawback that, making common use of the bias oscillator 26, both channels of the system are subject to simultaneous changes in recording bias. Such simultaneous bias changes are objectionable, and indeed impair the claimed advantages of the Dolby HX system, in cases where the signal frequencies and levels are to differ between the two channels. The changing of bias through changes in the supply voltage applied to the bias oscillator 26 is also undesirable because it feeds the erase current of varying magnitude to the pair of erase heads 30 and 30', adversely affecting their performance.

Figure 2:
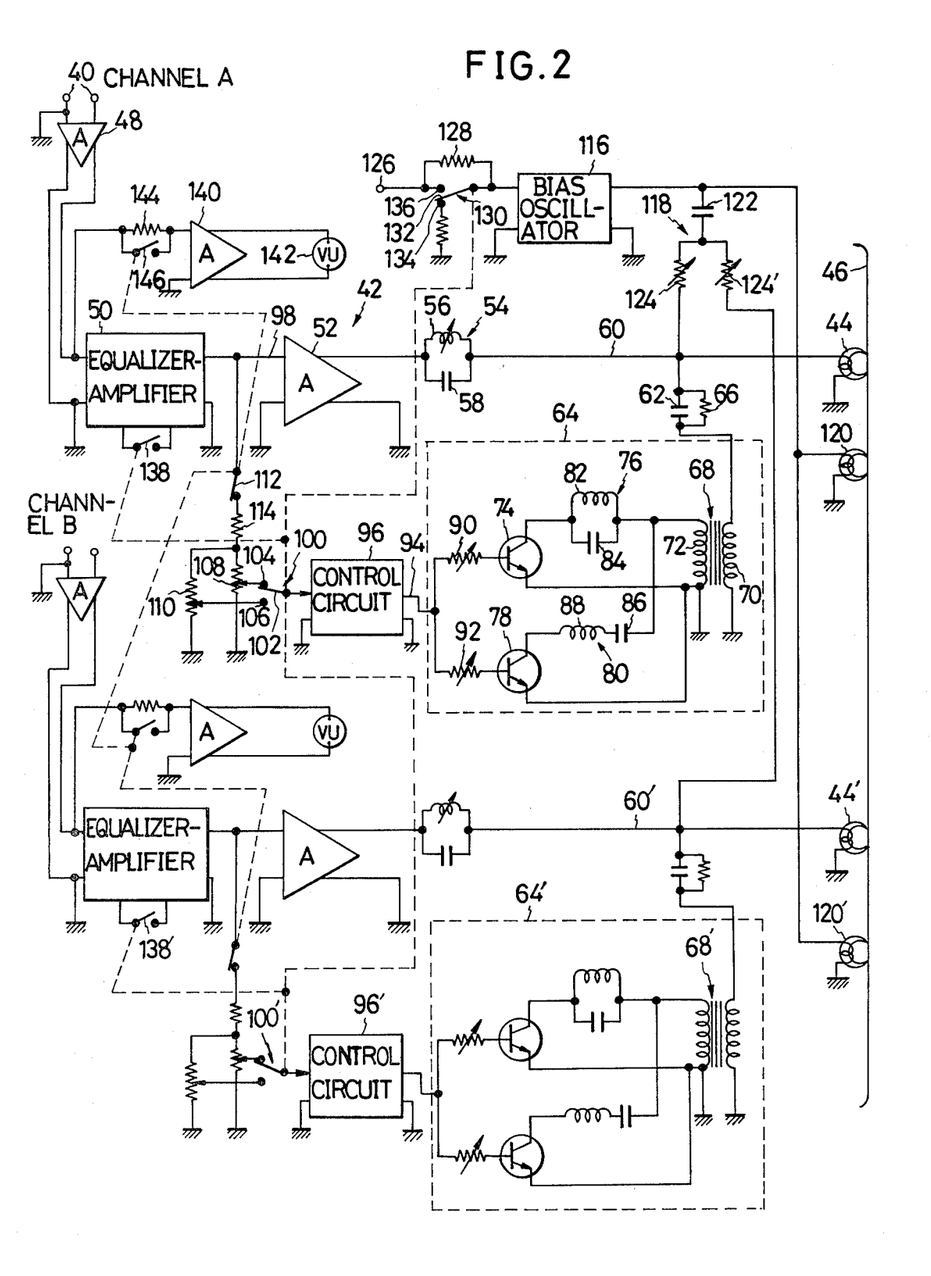
FIG. 2 is a schematic diagram, partly in block form, of the improved magnetic recording system according to my invention as adapted for the two-channel recording of audio signals on magnetic tape.

I will now describe the improved magnetic recording system of my invention in terms of a preferable embodiment thereof. FIG. 2 illustrates my invention as adapted for a two-channel audio take deck. The two channels, A and B, of the magnetic recording system are of identical configuration, except where otherwise noted specifically, so that I will describe only the channel A in detail and, as required, identify the various parts of the channel B by priming the reference numerals used to denote the corresponding parts of the channel A.

The channel A of the magnetic recording system has a pair of information input terminals 40 coupled, via an information signal processing circuit generally designated 42, to a magnetic record head 44 arranged for sliding contact with magnetic tape 46. The information signal processing circuit 42 comprises an input amplifier circuit 48, an equalizer-amplifier circuit 50, a buffer amplifier 52, and a bias trap circuit 54, which are serially connected in that order from the input terminal pair 40 toward the record head 44. The buffer amplifier 52 includes current-regulating impedance means for holding substantially constant the current flowing to the record head 44 irrespective of changes in its impedance, as will be detailed later in connection with FIG. 3. The bias trap circuit 54 is shown as a parallel connection of inductance coil 56 and capacitor 58.

The information signal processing circuit 42 delivers the processed information signal to the record head 44 by way of a delivery line 60.

Shown at 116 is a bias oscillator for generating a bias current having a frequency of, say, 100 kilohertz (kHz), which is much higher than the spectrum of the information signal to be recorded. The output of the bias oscillator 116 is connected, via an impedance circuit 118, to the delivery line 60 leading to the record head 44. The bias oscillator output is further coupled directly to an erase head 120 for feeding the 100 kHz erase signal thereto, so that the bias oscillator 116 should more properly have been termed a bias and erase oscillator. The impedance circuit 118 is shown as a serial connection of capacitor 122 and resistor 124 and functions to set the magnitude of the bias current traveling therethrough toward the record head 44.

A consideration of FIG. 2 will reveal that both channels A and B of the recording system share the bias oscillator 116, as well as the capacitor 122 of the impedance circuit 118. Accordingly, the capacitor 122 is further coupled, via another resistor 124', to the delivery line 60' of the channel B, and the bias oscillator 116 is further coupled directly to another erase head 120' associated with the channel B.

Connected in series between the delivery line 60 and ground are a capacitor 62 and a variable impedance circuit 64. Intended to function as a high-pass filter, the capacitor 62 has a capacitance of, say, 0.0056 farads (F) to offer low impedance to the high frequencies of the information signal and to the bias current frequency of 100 kHz. The impedance of the capacitor 62 is to lower with an incrrease in the frequencies. The capacitor 62 is connected in parallel with a resistor 66 of, say, 33 kilohms (kohm) to prevent its resonance with a transformer 68 in the variable impedance circuit 64.

Constituting a feature of my invention, the variable impedance circuit 64 acts as a variable attenuator, as will become apparent as the description proceeds. The transformer 68 included in this variable impedance circuit 64 comprises a primary winding 70 and a secondary winding 72 coupled to each other. The transformer primary 70 has one of its extremities connected to the delivery line 60 via the capacitor 62, and its other extremity grounded. Since the delivery line 60 is also grounded via the record head 44, the transformer primary 70, and indeed the variable impedance circuit 64 itself, can be considered to be connected in parallel with the record held.

The transformer secondary 72 is connected in parallel with a level control transistor 74 via another bias trap circuit 76, and with a bias control transistor 78 via an inductance-capacitance (LC) resonant circuit 80. More specifically, one extremity of the transformer secondary 72 is coupled to the collector of the level control transistor 74 via the bias trap circuit 76, which is a parallel connection of inductance coil 82 and capacitor 84. The other extremity of the transformer secondary 72 is coupled directly to the emitter of the level control transistor 74. Said one extremity of the transformer secondary 72 is further coupled to the collector of the bias control transistor 78 via the LC resonant circuit 80, and said other extremity of the transformer secondary is coupled directly to the emitter of this transistor 78. The LC resonant circuit 80 is a serial connection of capacitor 86 and inductance coil 88, offering low impedance to the 100 kHz bias frequency. The variable impedance circuit 64 further comprises a pair of variable resistors 90 and 92, through which the bases of the transistors 74 and 78 are coupled to a control input line 94 of the circuit 64.

A control circuit 96 is connected between the output line 98 of the equalizer-amplifier circuit 50, in the information signal processing circuit 42, and the control input 94 of the variable impedance circuit 64. This control circuit 96 includes a high-pass filter and a rectifier circuit, as will be detailed later with reference to FIG. 4, for delivering to the variable impedance circuit 64 a direct current (DC) output whose magnitude corresponds to the level of the high frequency spectrum of the incoming information signal.

The control circuit 96 excites the level control transistor 74 and bias control transistor 78 of the variable impedance circuit 64 in such a way that the transistors act as variable impedance elements. The transistor-exciting output voltage of the control circuit 96 increases in response to high levels at high frequencies of the incoming information signal, with a consequent decrease in the resistance values of the transistors 74 and 78. Thus the magnitudes of the secondary and primary currents of the transformer 68 increase; in other words, the impedance of the transformer primary 70 decreases. The bias current fed from the bias oscillator 116 to the delivery line 60 is divided into fractions, one flowing to the record head 44 and the other to the transformer primary 70, as determined by the ratio of the impedances of the record head and the transformer primary.

It is therefore apparent that the bias current actually fed to the record head 44 is reduced as the impedance of the transformer primary 70 decreases as above. A low value of recording bias is thus obtained which is suitable for recording high frequencies on the magnetic tape 46.

The capacitor 62 permits the passage therethrough of not only the bias current but also the high frequency portion of the information signal specturm. Thus, along with the fraction of the bias current, the high frequency portion of the information signal partly flows off the delivery line 60 toward the transformer primary 70. It will therefore be seen that the variable impedance circuit 64 and control circuit 96 act not only to control the bias current fed to the record head 44 but further to compensate for the changes in the equalization characteristic resulting inevitably from the bias changes.

The illustrated tape deck is intended for use with both normal tape and high quality tape such as chromium oxide (CrO2) tape. Thus a single-pole, double-throw tape selector switch 100 is connected between the equalizer-amplifier circuit output line 98 and the input of the control circuit 96. The tape selector switch 100 comprises a movable contact 102 coupled to the control circuit 96, and two fixed contacts 104 and 106 coupled to respective resistors 108 and 110 each connected between output line 98 and ground. The movable contact 102 is to be activated into engagement with the fixed contact 104 in use of normal tape, and with the other fixed contact 106 in use of high quality tape. The output signal of the equalizer-amplifier circuit 50 is therefore delivered to the control circuit 96 at a level suiting the particular type of tape in use.

Further connected in series between the equalizer-amplifier circuit output line 98 and the tape selector switch 100 are a single-pole, single-throw switch 112 and a high resistance resistor 114. The user may selectively close or open the switch 112 according to whether or not he wishes to have bias and equalization adapted to the program to be recorded.

Another single-pole, double-throw tape selector switch 130 is connected in parallel with a resistor 128 between the input of the bias oscillator 116 and a supply terminal 126. This tape selector switch comprises a movable contact 132 coupled to the bias oscillator 116, a first fixed contact 134 connected to ground, and a second fixed contact 136 coupled to the supply terminal 126. The movable contact 132 is to be activated into engagement with the first fixed contact 134 in use of normal tape, and with the second fixed contact 136 in use of high quality tape. The supply voltage is therefore applied to the bias oscillator 116 after dropping across the resistor 128 if the movable contact 132 is engaged with the first fixed contact 134 for the use of normal tape, and without such a drop if the movable contact is engaged with the second fixed contact 136 for use of high quality tape. The output voltage of the bias oscillator 116 varies correspondingly in conformity with the type of tape in use.

As is well known in the art, the performance of the equalizer-amplifier circuit 50 must also be modified depending upon the kind of tape in use. To this end the equalizer-amplifier circuit 50 is provided with a single-pole, single-throw switch 138 which is to be close in use of high quality tape. The switches 100, 130 and 138, as well as the corresponding switches 100' and 138' of the channel B, are ganged for simultaneous activation. The switch 130 is common to both channels A and B.

Coupled to the input terminals 40 or to the information signal processing circuit 42 via an amplifier 140, a level indicator 142 is normally calibrated in volume units (VU) to indicate recording levels. The input stage of the amplifier 140 has a parallel connection of resistor 144 and single-pole, single-throw switch 146. This switch 146 is ganged with the noted switch 112, so as to be opened with the closure of the switch 112, and functions to change the input magnitude, and therefore sensitivity, of the VU indicator 142. When the variable bias and equalization function of the tape deck is acting by the closure of the switch 112, the tape 46 saturates at a higher level at high frequencies than when the switch 112 is open. Therefore, by switching the sensitivity of the VU indicator 142, the user is informed that recording at higher levels is possible. He may make the level setting of the tape deck higher for more faithful recording, and subsequent playback, of the program of his choice.

Figure 3:
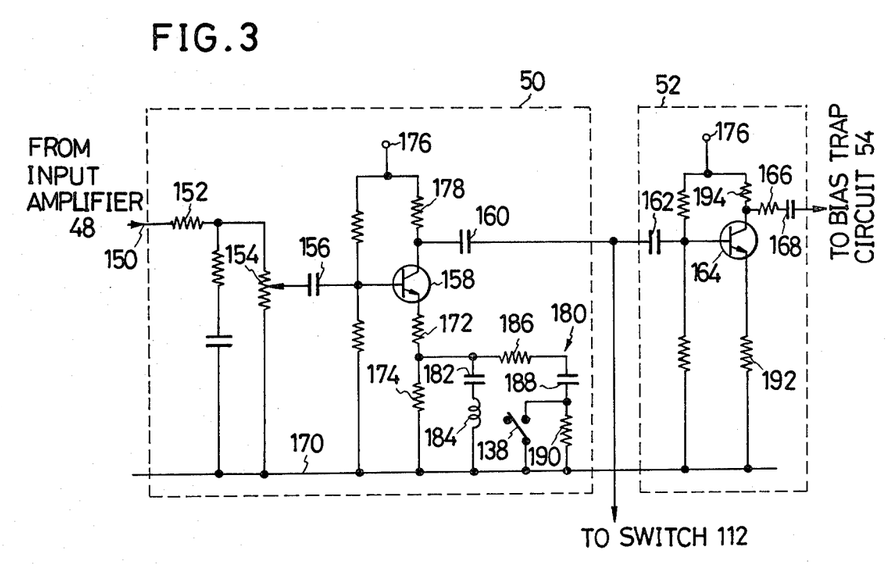
FIG. 3 is a schematic diagram showing in greater detail one of the two identical equalizer-amplifier circuits and one of the two identical buffer amplifiers in the two-channel magnetic tape recording system of FIG. 2.

FIG. 3 is a detailed representation of the equalizer-amplifier circuit 50 and of the buffer amplifier circuit 52 connected subsequently. The equalizer-amplifier circuit 50 has a pair of input lines 150 connected to the input terminals 40 via the input amplifier circuit 48. The information signal from the input amplifier 48 is amplified as it flows through the path comprising resistor 152, variable resistor 154, capacitor 156, transistor 158, and capacitor 160, which are all included in the equalizer-amplifier circuit 50, and further through the path comprising capacitor 162, transistor 164, resistor 166, and capacitor 168, which are all included in the buffer amplifier circuit 52.

The emitter of the transistor 158 in the equalizer-amplifier circuit 50 is coupled to grounding line 170 via resistors 172 and 174 in series. The collector of the transistor 158 is coupled to a supply terminal 176 via a resistor 178 of, say, 5.6 kohm. The resistor 174 is connected in parallel with an equalizer circuit, generally labeled 180, forming part of the equalizer-amplifier circuit 50. The equalizer circuit 180 comprises a capacitor 182, reactor 184, resistor 186, capacitor 188, and resistor 190, which are connected as shown, for increasing the level of the information signal at high frequencies. Thus the information signal undergoes an equalization process as it flows through the equalizer-amplifier circuit 50. The aforesaid switch 138 is connected in parallel with the resistor 190 of the equalizer circuit 180 to modify its equalizing characteristic depending upon the type of tape in use.

The emitter of the transistor 164 in the buffer amplifier circuit 52 is coupled to the grounding line 170 via a resistor 192. The collector of the transistor 164 is coupled to the supply terminal 176 via a 5.6-kohm resistor 194 acting as a current-regulating impedance element. The resistor 166 may be of about 22 kohm and also acts as a current-regulating impedance element.

Figure 4:
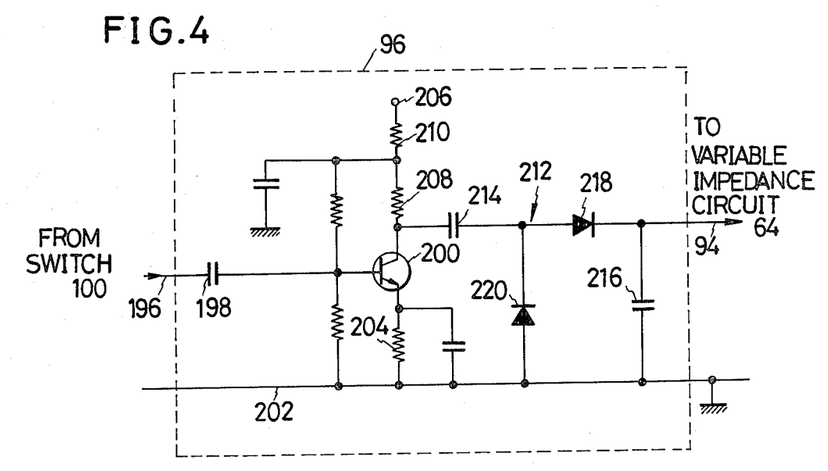
FIG. 4 is a schematic diagram showing in greater detail one of the two identical control circuits in the system of FIG. 2.

FIG. 4 shows the control circuit 96 of FIG. 2 in detail. The input line 196 of the control circuit 96 connects the tape selector switch 100 of FIG. 2 to a capacitor 198 of, say, 0.0022 microfarad which is to function as a high-pass filter. The capacitor 198 is coupled to the base of an amplifying transistor 200, the emitter of which is coupled to a grounding line 202 via a resistor 204. The collector of the transistor 200 is coupled to a supply terminal 206 via two resistors 208 and 210 in series and also to a voltage doubler circuit generally designated 212. The voltage double circuit 212 comprises two capacitors 214 and 216 and two diodes 218 and 220, which are connected as drawn.

Such being the configuration of the control circuit 96, its capacitor 198 derives only the high frequency portion from the incoming information signal. The high frequency signal is subsequently amplified by the transistor 98 and then converted into a DC voltage by the voltage doubler circuit 212. Thus the control circuit 96 delivers to the control input 94 of the variable impedance circuit 64 a DC output corresponding from moment to moment to the levels of the high frequency portion of the information signal from the processing circuit 42.

OPERATION

Figure 5:
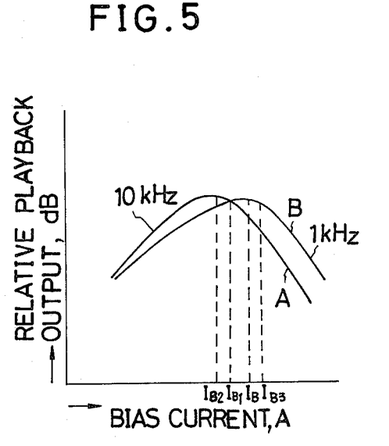
FIG. 5 is a graph plotting the curves, at two different high frequencies, of the relative playback output against bias current, in order to explain the operation of the magnetic recording system according to my invention.
Figure 6:
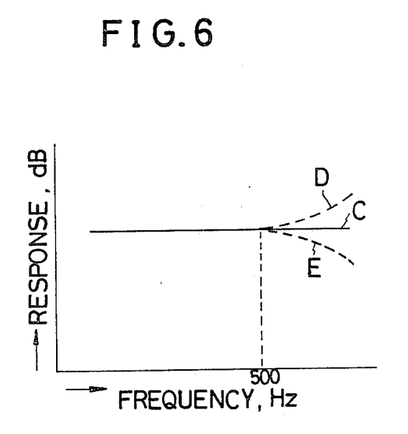
FIG. 6 is a graphic representation of bias-dependent frequency-response characteristic useful in explaining the operation of the system according to my invention.

Reference is now directed to the graphs of FIGS. 5 and 6 in order to describe the bias and equalization controls of the magnetic recording system in accordance with my invention. FIG. 5 plots the curves, at two different high frequencies, of relative playback output in decibels (dB) against recording bias current in amperes (A). The curve A represents a 10 kHz signal, and the curve B represents a 1 kHz signal.

According to the conventional fixed bias principle the magnitude of the recording bias current is a compromise between high frequency saturation and other aspects of performance, as has been mentioned. Recording bias has been set, for example, at $I_B$ where the playback output of the 1 kHz signal peaks, or at $I_{B1}$ where the curves of the 1 kHz and 10 kHz signals cross each other. These bias values are higher than a bias value $I_{B2}$ to obtain the peak of the playback output of the 10 kHz signal. The fixed bias value $I_B$, for example, is optimum only for the frequency of 1 kHz, being too low for lower frequencies and too high for higher frequencies.

In the improved variable-bias recording system of my invention it is understood that recording bias has a fixed value $I_{B3}$, higher than the conventional bias value $I_B$ or $I_{B1}$, during the delivery of low frequencies (e.g., below 500 Hz) to the record head 44, that is, when the variable impedance circuit 64 is not functioning. The high bias value $I_{B3}$ makes it possible to make a distortionless recording of such low frequencies, offering a high maximum output level than has been possible theretofore.

The following is the description of the operation of my improved recording system in cases wherein the information signal on the channel A contains high frequencies above 500 Hz. Receiving the information signal from the equalizer-amplifier circuit 50 via the switches 100 and 112, the control circuit 96 derives the high frequency portion therefrom, converts same into a direction current, and puts out a DC voltage in proportion with the high frequency signal level.

The DC output voltage of the control circuit 96 is impressed to the level control transistor 74 and bias control transistor 78 in the variable impedance circuit 64. When the bias control transistor 78 assumes a resistance value corresponding to the impressed DC voltage, only the 100 kHz bias component flows to the transistor 78 via the LC resonant circuit 80. As a consequence the primary 70 of the transformer 68 has a reduced impedance value with respect to the 100 kHz frequency of the bias current, so that a fraction of the bias current from the bias oscillator 116 flows off to the transformer primary 70, instead of to the record head 44. The bias current fed to the record head 44 is thus reduced to a magnitude suitable for recording the high frequencies, for example to $I_{B2}$ in FIG. 5 if the information signal contains a 10 kHz component. The record head 44 receives a nearly maximum sensitivity bias. It will of course be seen that the bias control transistor 78 is controlled so that the magnitude of the bias current fed to the record head 44 will decrease in step with an increase in the level of the high frequency range of the program being recorded.

An argument may be raised that such bias reduction is undesirable when the spectrum of the material being recorded contains not only high but also low (e.g., 333 Hz) frequencies at the same time. Admittedly, the reduced bias values are too low for such low frequencies, leading to their distortion. This presents no serious problem, however. Since bias reduction occurs only in response to high levels at high frequencies, on playback the louder high-frequency sound will mask the distorted low-frequency sound. The listener will hardly notice such masked low-frequency distortion.

Bias reduction in step with high levels at high frequencies results also in changes in the frequency-response characteristic. For example, if the bias current has an intermediate value $I_B$ in FIG. 5, a flat frequency-response characteristic will be obtained as indicated by the curve C in the graph of FIG. 6. Response at high frequencies above 500 Hz will rise at lower values of bias, as indicated at D in FIG. 6, and will drop at higher bias values, as indicated at E.

The improved variable-bias recording system of FIG. 2 incorporates the level control transistor 74, in the variable impedance circuit 64, for correcting the low-bias frequency-response characteristic D of FIG. 6 into the flat response C. Just like the bias control transistor 78 the level control transistor 74 receives from the control circuit 96 the DC exciting voltage corresponding to the levels at high frequencies of the information signal. The resistance value of the level control transistor 74 decreases with an increase in the information signal frequency and in its level.

Connected between the transformer secondary 72 and the collector of the level control transistor 74, the bias trap circuit 76 acts to inhibit the flow of the 100 kHz bias current to the transistor 74, permitting only the less-than-100-kHz frequency portion of the information signal to flow to the transistor 74. Thus the impedance of the transformer primary 70 with respect to the information signal varies in accordance with the level and frequency of the information signal, so that the frequency-response characteristic of the system becomes flat as at C in FIG. 6.

The capacitor 62 connected between delivery line 60 and variable impedance circuit 64 prevents the flow therethrough of the low frequencies that may be contained in the information signal together with the high frequencies at high levels. For this reason the variable impedance circuit 64 does not lower the levels of the low frequency portion of the information signal.

It will be noted from FIG. 2 that the transformer 68 in the variable impedance circuit 64 serves the dual purpose of bias control and level or equalization control. Both controls can nevertheless be performed accurately, as the bias trap circuit 76 and LC resonant circuit 80, both acting as filters, enable the transistor 74 to make level or equalization control and the other transistor 78 to make bias control. It will be difficult or practically impossible to make both bias and equalization controls by means of a single transistor, without the frequency division by the circuits 76 and 80. For example, if the single transistor sets the bias current of relatively high level at some optimum value, the transistor will be unable to control the level of the relatively low level information signal.

From the foregoing it is clear that the illustrated two-channel audio tape deck gains the following advantages:

1. The pair of record heads 44 and 44' are provided with their own variable impedance circuits 64 and 64' and control circuits 96 and 96'. Thus, even though the information signal frequencies and levels may differ between the two channels A and B, recording bias having values suiting the respective channels can be fed to the record heads 44 and 44'.

2. The bias oscillator 116 produces a constant output without being itself affected by the variable impedance circuits 64 and 64'. The erase signal applied to the pair of erase heads 120 and 120' is therefore totally independent of the bias changes, permitting the erase heads to perform a constant, positive erasing function.

3. The variable impedance circuits 64 and 64' are materially simplified in configuration as each employs but one transformer 68 or 68' to perform both bias and equalization controls.

4. The level and bias control transistors 74 and 78 of each variable impedance circuit can be of low voltage-withstanding ability and nevertheless will perform accurate bias and equalization controls, only if the number of turns of the transformer primary 70 is made greater than that of the secondary 72.

5. Since the signal current on the delivery line 60 is divided at high frequencies, no high frequency current in excess of the saturation level of the tape 46 will flow to the record heads 44 and 44'.

MODIFICATIONS

Figure 7:
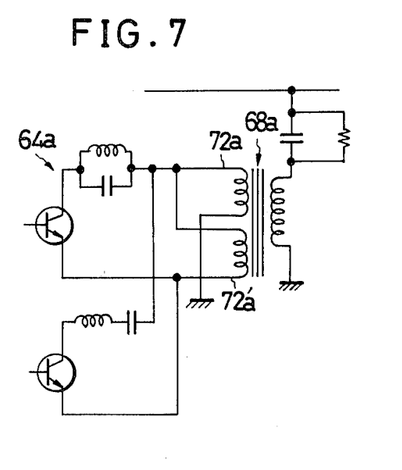
FIGS. 7, 8, 9, 10 and 11 are schematic diagrams each showing a different modification of the system of FIG. 2.

FIG. 7 shows a slight modification 64a of each of the variable impedance circuits 64 and 64'. The modified variable impedance circuit 64a features a transformer 68a having two secondary windings 72a and 72a' in parallel connection. The two transformer secondaries 72a and 72a' can be connected to the other parts of the circuit 64a as shown.

Figure 8:
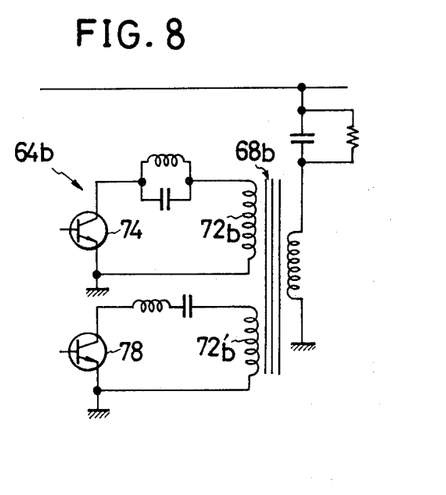

FIG. 8 shows another modified variable impedance circuit 64b, which includes a transformer 68b having two secondary windings 72b and 72b' disconnected from each other. The transformer secondary 72b has its opposite extremities coupled to the level control transistor 74, and the other secondary 72b' has its opposite extremities coupled to the bias control transistor 78.

Figure 9:
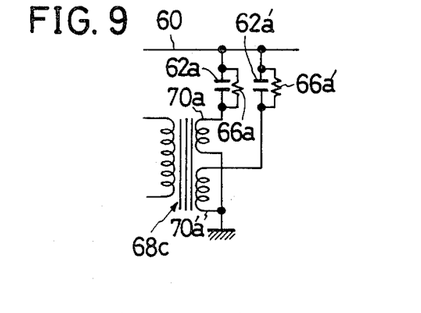

At 68c in FIG. 9 is shown a further modified transformer having two primary windings 70a and 70a'. The primary 70a has one of its extremities grounded and the other extremity coupled to the delivery line 60 via a parallel connection of capacitor 62a and 66a. The other primary 70a' has likewise one of its extremities grounded and the other extremity coupled to the delivery line 60 via a parallel connected of capacitor 62a' and resistor 66a'.

Figure 10:
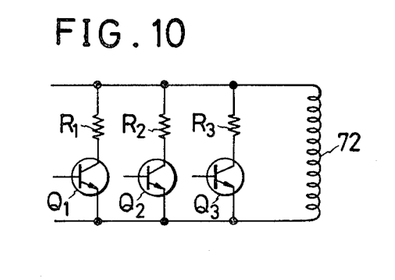

If desired, moreover, the bias control transistor 78, as well as the level control transistor 74, in the variable impedance circuit 64 may be replaced by a number of resistors R1, R2, R3 . . . together with corresponding switching transistors Q1, Q2, Q3 . . . , connected to the transformer secondary 72 as shown in FIG. 10. The transformer primary impedance can then be controlled digitally through on-off control of the switching transistors Q1, Q2, Q3...

Figure 11:
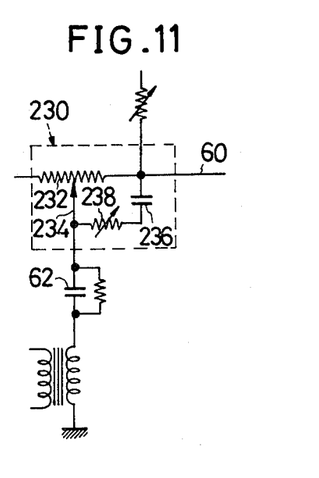

FIG. 11 illustrates a further modification featuring a bias and equalization characteristic control circuit 230 inserted in the delivery line 60. The circuit 230 comprises a variable resistor 232 of, say, 22 kohm serially connected in the delivery line 60 and having a slider 234 coupled to the capacitor 62, a capacitor 236 of, say 330 pF coupled to the delivery line, and another variable resistor 238 for bias adjustment connected between the capacitor 236 and the slider 234 of the resistor 232. If the capacitor 236 is adjusted to permit the passage of only the bias frequency therethrough, preventing the flow of the information signal frequencies, then the circuit 230 will make it possible to adjust the dividing ratio of the bias current and of the information current.

Although not illustrated, additional modifications or variations of the embodiment disclosed herein will readily occur to one skilled in the art. The following is a list of such possible modifications and variations:

1. The LC resonant circuit 80 connected in series with the bias control transistor 78 in the variable impedance circuit 64 may be omitted if a considerable difference exists between the levels of the bias and information signals. Without the resonant circuit the high level bias signal will flow to the transistor 78, but the low level information signal will hardly flow to the transistor, so that only the bias signal will be controlled.

2. The variable impedance circuit 64 may be so modified as to individually control several different frequency bands of the information signal, instead of controlling its spectrum altogether. To this end a corresponding number of transistors may be coupled to the secondary winding 72 of the transformer 68 via respective bandpass filters.

3. If the program to be recorded is of known spectrum and at known levels, preset control voltages may be applied to the level control transistor 74 and bias control transistor 78, instead of making automatic control thereof as in the illustrated embodiment.

4. Field effect transistors may be employed in place of the transistors 74 and 78, which are shown to be of the NPN type.

5. Recording bias may be set at the conventional value of $I_B$, instead of at $I_{B3}$, when the information signal contains low frequencies only. My improved recording system will nevertheless provide improved performance at high frequencies.

6. A level control circuit including the transistor 74, and a bias control circuit including the transistor 78, may be independently connected in parallel with each record head.

7. The bias oscillator 116 may be provided with an output transformer, and the record and erase heads may be coupled to its different taps.

8. The pair of recording heads 44 and 44', and the pair of erase heads 120 and 120', may be combined respectively into unitary assemblies.

The above and other modifications and variations within the usual knowledge of the specialists are intended in the foregoing disclosure. My invention is therefore not to be limited except as defined by the following claims.

I claim:

1. A magnetic recording system for recording information signals on magnetic record media, comprising:
 (a) a magnetic head for magnetically recording an information signal on a magnetic record medium;
 (b) an information signal processing circuit coupled to the magnetic head for processing the incoming information signal prior to delivery to the magnetic head, the information signal processing circuit including:
  (1) equalizer means for increasing the level of the information signal at high frequencies; and
  (2) current-regulating impedance means for holding substantially constant the current flowing to the magnetic head irrespective of changes in the impedance of the magnetic head;
 (c) a bias oscillator for feeding to the magnetic head a bias current having a frequency higher than the spectrum of the information signal;
 (d) impedance means connected between the bias oscillator and the magnetic head for setting the magnitude of the bias current fed to the magnetic head;
 (e) a transformer comprising a primary winding and a secondary winding, the primary winding of the transformer being connected in parallel with the magnetic head;
 (f) a bias control transistor connected in parallel with the secondary winding of the transformer; and
 (g) a control circuit connected to a base of the bias control transistor for varying the impedance thereof, the control circuit being effective to reduce the impedance of the transistor for decreasing the magnitude of the bias current fed to the magnetic head and to increase the impedance of the transistor for increasing the magnitude of the bias current fed to the magnetic head.

2. A variable-bias, variable-equalization magnetic recording system for recording information signals on magnetic record media, comprising:
 (a) a magnetic head for magnetically recording an information signal on a magnetic record medium;
 (b) an information signal processing circuit coupled to the magnetic head for processing the incoming information signal prior to delivery to the magnetic head, the information signal processing circuit including:
  (1) equalizer means for increasing the level of the information signal at high frequencies; and
  (2) current-regulating impedance means for holding substantially constant the current flowing to the magnetic head irrespective of changes in the impedance of the magnetic head;
 (c) a bias oscillator for feeding to the magnetic head, a bias current having a frequency higher than the spectrum of the information signal;
 (d) impedance means connected between the bias oscillator and the magnetic head for setting the magnitude of the bias current fed to the magnetic head;
 (e) transformer comprising a primary winding and a secondary winding, the primary winding of the transformer being connected in parallel with the magnetic head;
 (f) a bias control transistor connected in parallel with the secondary winding of the transformer;
 (b) a level control transistor connected in parallel with the secondary winding of the transformer;
 (h) a bias trap circuit connected between the secondary winding of the transformer and the level control transistor, the bias trap circuit being effective to prevent the passage of the bias current frequency therethrough; and (i) a control circuit connected to bases of the bias control transistor and the level control transistor for varying the impedances thereof, the control circuit being effective to reduce the impedances of the bias control transistor and the level control transistor for decreasing the magnitude of the bias current fed to the magnetic head and for decreasing the high frequency level of the information signal, the control circuit being also effective to increase the impedances of the bias control transistor and the level control transistor for increasing the magnitude of the bias current fed to the magnetic head and for increasing the high frequency level of the information signal.

3. The magnetic recording system as recited in claim 2, wherein the control circuit comprises:
(a) a high-pass filter for permitting the passage therethrough of the high frequency portion of the information signal which has been processed by the equalizer means of the information signal processing circuit; and
(b) a rectifier for converting the output from the high-pass filter into a direct current.

4. The magnetic recording system as recited in claim 2 wherein the information signal processing circuit and the impedance means are coupled to the magnetic head via a delivery line, and wherein the primary winding of the transformer is connected to the delivery line via a capacitor offering low impedance to the high frequency portion of the information signal and to the bias current.

5. The magnetic recording system as recited in claim 2, further comprising:
(a) a first switch connected between the information signal processing circuit and the control circuit for selectively turning the control circuit on or off;
(b) level indicator means coupled to the information signal processing circuit for indicating the level of the information signal to be recorded; and
(c) a second switch coupled to the level indicator means and ganged with the first switch for changing the sensitivity of the level indicator means according to whether the variable bias and equalization function of the system is acting or not.

6. The magnetic recording system as recited in claim 2, further comprising an erase head for erasing information on the record medium, the erase head being coupled directly to the bias oscillator.

* * * * *